US012688035B2

(12) United States Patent
Goldman et al.

(10) Patent No.: US 12,688,035 B2
(45) Date of Patent: Jul. 21, 2026

(54) OBJECT-BASED DOCUMENTATION GENERATION

(71) Applicant: Capital One Services, LLC, McLean, VA (US)

(72) Inventors: Richard Goldman, Falls Church, VA (US); Kumari Bhawprita, Glen Allen, VA (US); Uday Jain, Glen Allen, VA (US); Narayanan Subramanian, Frisco, TX (US); Finley Kirvan, San Francisco, CA (US); Glen Rucker, Mechanicsville, VA (US); Mihir Shah, Glen Allen, VA (US); Kaushal Pandya, Glen Allen, VA (US); Ramesh Chandra, Glen Allen, VA (US); Nihar Pradhan, Glen Allen, VA (US); Shailendra Jain, Henrico, VA (US); Bal Reddy Cherlapally, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 269 days.

(21) Appl. No.: 18/649,954

(22) Filed: Apr. 29, 2024

(65) Prior Publication Data

US 2025/0335192 A1 Oct. 30, 2025

(51) Int. Cl.
　*G06F 21/00* (2013.01)
　*G06F 8/41* (2018.01)
　　　(Continued)
(52) U.S. Cl.
　CPC ............... *G06F 8/73* (2013.01); *G06F 8/427* (2013.01); *G06F 8/71* (2013.01); *G06F 40/186* (2020.01)

(58) Field of Classification Search
　USPC ......................................................... 717/123
　See application file for complete search history.

(56) References Cited

U.S. PATENT DOCUMENTS 7,895,516 B2 * 2/2011 Harrop ................. G06F 40/103
　　　　　　　　　　　　　　　　　　　715/239
9,891,900 B2 * 2/2018 Goetz ................. G06F 9/44521
　　　　　　　　(Continued)

OTHER PUBLICATIONS

Abdurahman, Muhamad et al. Lex2KG: Automatic Conversion of Legal Documents to Knowledge Graph. 2021 International Conference on Advanced Computer Science and Information Systems (ICACSIS). https://ieeexplore.ieee.org/stamp/stamp.jsp?tp=&arnumber=9631310 (Year: 2021).*

(Continued)

*Primary Examiner* — Jeremiah L Avery
(74) *Attorney, Agent, or Firm* — Harrity & Harrity, LLP

(57) ABSTRACT

In some implementations, a device may load, from a code repository, a code file containing code for a plurality of object data structures that indicate respective values for a set of object parameters, where the code is in a form for interpretation by a code interpreter. The device may instantiate a plurality of objects in accordance with the plurality of object data structures. The device may retrieve a first template that provides a first formatting used for generating end-user documentation. The device may generate a documentation document using the plurality of objects and the first template. The device may retrieve a second template that provides a second formatting used for generating metadata for the documentation document. The device may generate the metadata using the second template. The device may insert the metadata into the documentation document.

20 Claims, 8 Drawing Sheets

(51) Int. Cl.
    *G06F 8/71*         (2018.01)
    *G06F 8/73*         (2018.01)
    *G06F 40/186*     (2020.01)

(56) References Cited

U.S. PATENT DOCUMENTS

| | | | | |
|---|---|---|---|---|
| 10,521,223 | B1 * | 12/2019 | Bogushefsky, III | G06F 8/71 |
| 11,481,545 | B1 * | 10/2022 | Aviles | G06F 40/186 |
| 11,681,523 | B1 * | 6/2023 | Jahr | G06F 8/60 |
| | | | | 717/121 |
| 11,809,688 | B1 * | 11/2023 | Parasnis | G06F 3/04845 |
| 12,056,255 | B1 * | 8/2024 | Mystetskyi | G06F 9/445 |
| 2016/0283460 | A1 * | 9/2016 | Weald | G06Q 30/0277 |
| 2018/0341629 | A1 * | 11/2018 | Brandon | G06F 40/186 |
| 2019/0034243 | A1 * | 1/2019 | Kramer | G06F 9/4401 |
| 2019/0042554 | A1 * | 2/2019 | Aylett | G06F 40/186 |
| 2020/0184586 | A1 * | 6/2020 | Ervin | G06Q 50/18 |
| 2020/0264899 | A1 * | 8/2020 | Kalinin | G06F 9/4494 |
| 2021/0110105 | A1 * | 4/2021 | Smajic | H04L 51/18 |
| 2021/0174006 | A1 * | 6/2021 | Stokes | G06Q 50/18 |
| 2021/0191718 | A1 * | 6/2021 | Draude | G06F 8/77 |
| 2021/0342785 | A1 * | 11/2021 | Mann | G06F 40/18 |
| 2022/0027615 | A1 * | 1/2022 | Borhanazad | G06V 30/418 |
| 2022/0091826 | A1 * | 3/2022 | Collins | G06F 8/51 |
| 2022/0156456 | A1 * | 5/2022 | Gadiya | G06V 30/418 |
| 2022/0164528 | A1 * | 5/2022 | Klatt | G06F 3/0484 |
| 2022/0222047 | A1 * | 7/2022 | Todirel | G06F 9/453 |
| 2023/0065934 | A1 * | 3/2023 | Lingineni | G06V 30/153 |
| 2023/0214424 | A1 * | 7/2023 | Jansz | G06Q 50/18 |
| | | | | 707/798 |
| 2024/0086647 | A1 * | 3/2024 | Ramanujam | G06F 16/345 |
| 2024/0296281 | A1 * | 9/2024 | Knapp | G06F 40/174 |
| 2025/0138986 | A1 * | 5/2025 | Bazzo | G06F 11/362 |

OTHER PUBLICATIONS

Sicat, Ma. Gracia Corazon E. et al. iPad: Integrated Paperless Document Checking and Template-Based Editor for Electronic Thesis Compilation. 2009 Second International Conference on Computer and Electrical Engineering. https://ieeexplore.ieee.org/stamp/stamp.jsp?tp=&arnumber=5380212 (Year: 2009).*

"Sphinx Documentation—Welcome," https://www.sphinx-doc.org/en/master/, 2024, 4 pages.

"OpenAPI Initiative—Home 2024," https://www.openapis.org, 2024, 4 pages.

"phpDocumentor—Home," https://www.phpdoc.org, 2024, 4 pages.

"Doxygen Homepage," https://www.doxygen.nl, 2023, 6 pages.

"apiDoc—Inline Documentation for RESTful web APIs," https://apidocjs.com, 2024, 26 pages.

* cited by examiner

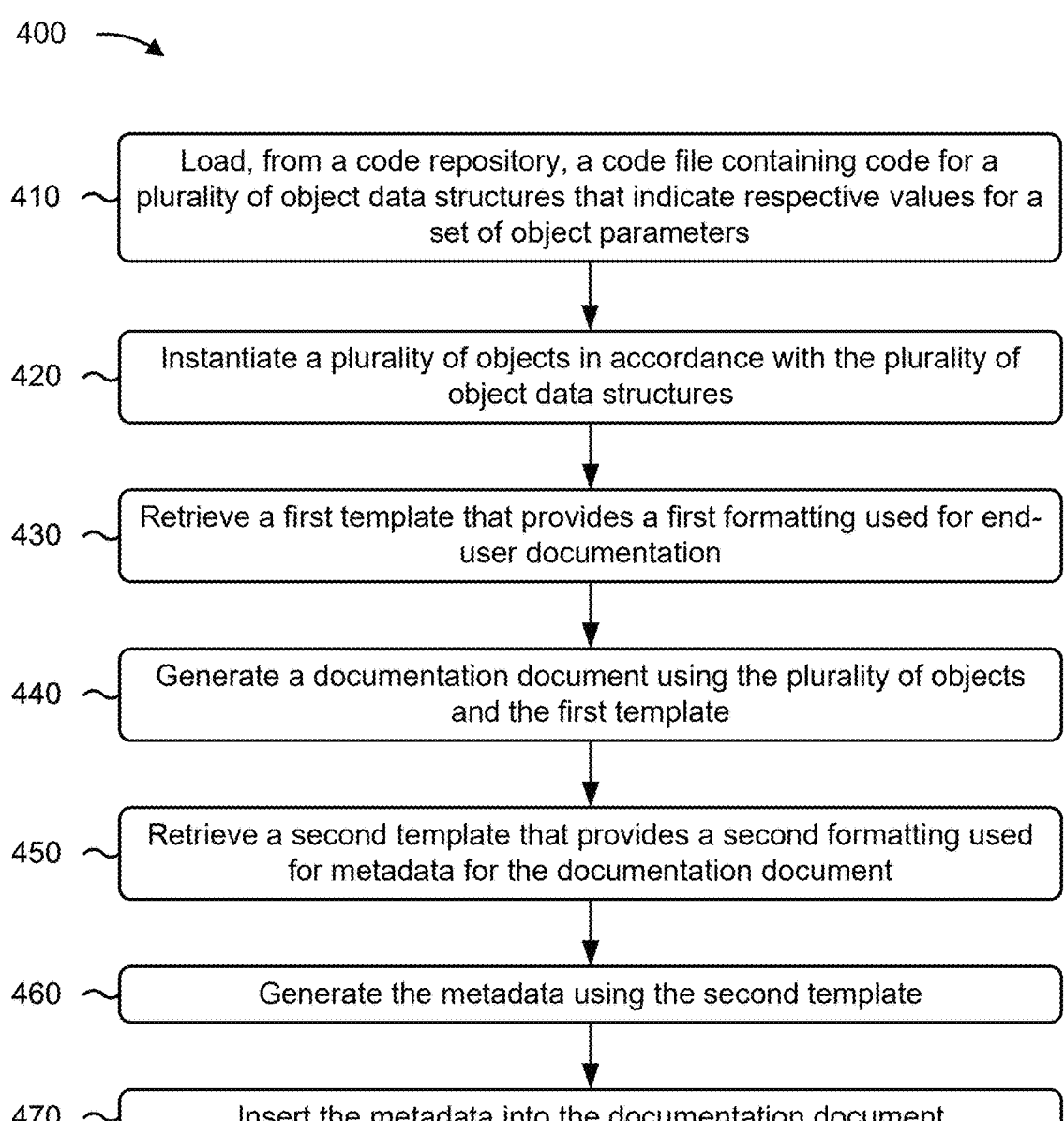

400

410 — Load, from a code repository, a code file containing code for a plurality of object data structures that indicate respective values for a set of object parameters 420 — Instantiate a plurality of objects in accordance with the plurality of object data structures 430 — Retrieve a first template that provides a first formatting used for end-user documentation 440 — Generate a documentation document using the plurality of objects and the first template 450 — Retrieve a second template that provides a second formatting used for metadata for the documentation document 460 — Generate the metadata using the second template 470 — Insert the metadata into the documentation document

FIG. 4

OBJECT-BASED DOCUMENTATION GENERATION

BACKGROUND

A code repository may be associated with a version control system that manages changes to code over time. A code repository and a version control system may be used in product development to keep track of changes made to a codebase, to collaborate between developers, and/or to ensure that different versions of the code are properly maintained, among other examples. A code repository may be a centralized code repository (e.g., where all code is stored on a central server, and developers must connect to the server to access the code) or a distributed code repository (e.g., where each developer has their own copy of the code, and changes can be synchronized between copies). A version control system associated with a code repository may provide features, such as version control, branching, merging, and/or issue tracking, which make it easier for developers to collaborate and maintain high-quality codebases.

SUMMARY

Some implementations described herein relate to a system for object-based documentation generation. The system may include one or more memories and one or more processors communicatively coupled to the one or more memories. The one or more processors may be configured to load, from a code repository, a code file containing code for a plurality of object data structures that indicate respective values for a set of object parameters, where the code is in a form for interpretation by a code interpreter. The one or more processors may be configured to instantiate a plurality of objects in accordance with the plurality of object data structures. The one or more processors may be configured to parse the code file to extract the respective values for the set of object parameters from the plurality of objects. The one or more processors may be configured to retrieve a first template that provides a first formatting used for generating end-user documentation. The one or more processors may be configured to generate a documentation document using the respective values for the set of object parameters and the first template. The one or more processors may be configured to retrieve a second template that provides a second formatting used for generating metadata for the documentation document. The one or more processors may be configured to generate the metadata using the second template. The one or more processors may be configured to insert the metadata into the documentation document. The one or more processors may be configured to store the documentation document in a document repository.

Some implementations described herein relate to a method of object-based documentation generation. The method may include loading, from a code repository, a code file containing code for a plurality of object data structures that indicate respective values for a set of object parameters, where the code is in a form for interpretation by a code interpreter. The method may include instantiating a plurality of objects in accordance with the plurality of object data structures. The method may include retrieving a first template that provides a first formatting used for generating end-user documentation. The method may include generating a documentation document using the plurality of objects and the first template. The method may include retrieving a second template that provides a second formatting used for generating metadata for the documentation document. The method may include generating the metadata using the second template. The method may include inserting the metadata into the documentation document.

Some implementations described herein relate to a non-transitory computer-readable medium that stores a set of instructions. The set of instructions, when executed by one or more processors of a device, may cause the device to load, from a code repository, a code file containing code for a plurality of object data structures that indicate respective values for a set of object parameters, where the code is in a form for interpretation by a code interpreter. The set of instructions, when executed by one or more processors of the device, may cause the device to instantiate a plurality of objects in accordance with the plurality of object data structures. The set of instructions, when executed by one or more processors of the device, may cause the device to parse the code file to format the plurality of objects. The set of instructions, when executed by one or more processors of the device, may cause the device to retrieve a template that provides a formatting used for generating end-user documentation. The set of instructions, when executed by one or more processors of the device, may cause the device to generate a documentation document using the plurality of objects and the template.

BRIEF DESCRIPTION OF THE DRAWINGS

FIG. 4 is a flowchart of an example process associated with object-based documentation generation, in accordance with some embodiments of the present disclosure.

DETAILED DESCRIPTION

Figure 1A:
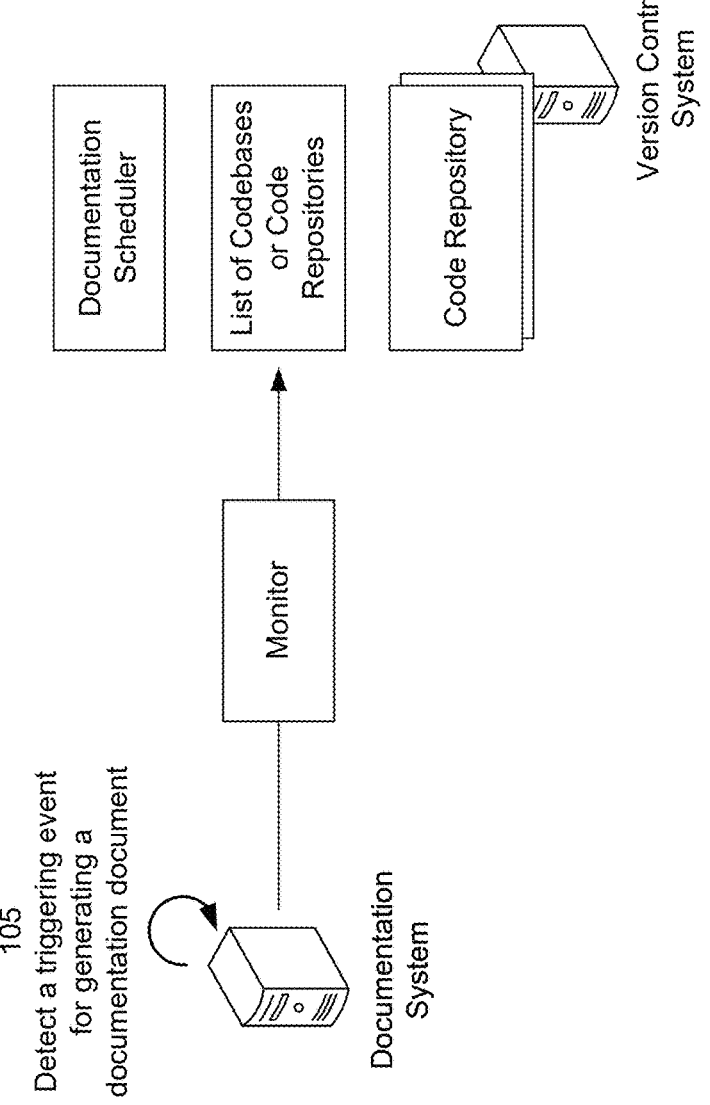
FIGS. 1A-1E are diagrams of an example associated with object-based documentation generation, in accordance with some embodiments of the present disclosure.

The following detailed description of example implementations refers to the accompanying drawings. The same reference numbers in different drawings may identify the same or similar elements.

A code repository may be associated with a version control system that manages changes to code over time. A code repository and a version control system may be used in product development to keep track of changes made to a codebase, to collaborate between developers, and/or to ensure that different versions of the code are properly maintained, among other examples. A codebase may be associated with a documentation set, which may include end-user documentation for understanding and/or using a product (e.g., a user guide, application programming interface (API) documentation, a technical specification, or the like). In one example, a documentation set may provide explanations for error codes that could be encountered during deployment of cloud infrastructure.

Documentation can be automatically generated from source code by parsing the source code and extracting structured information from specially formatted comments within the source code. These comments, which are ignored by a code interpreter or compiler, explain the aspects of the source code and are added manually to the source code specifically for the purpose of automatic documentation generation. The reliance on comments for documentation generation can be inefficient and prone to inconsistency. For example, comments might not be consistently updated in tandem with code changes, leading to gaps or inaccuracies in the generated documentation.

Furthermore, comments merely explain the functionality of the source code, which otherwise may be apparent from the source code itself. Thus, comments are redundant information that add considerable additional size to source code files. As a result, comments increase the consumption of computing resources involved in storing, retrieving, copying, and/or transmitting the source code.

Some implementations described herein enable documentation generation using a code file that expresses the content for the documentation in code that is in a form for interpretation by a code interpreter, rather than the content being expressed through separate annotations (e.g., comments) in the code file. For example, a code file may contain code for object data structures that indicate values for a set of object parameters. A system that performs documentation generation may load the code file (e.g., as a module imported into an executing code file), and instantiate objects in accordance with the data structures. These objects are easier to process and modify compared to plain-text annotations, thereby allowing for more efficient integration of the underlying content into templates used for documentation generation.

Moreover, because the documentation can be generated from the code itself, rather than through accompanying annotations, standardized and up-to-date documentation can be generated responsive to any changes to the code even if accompanying annotations are not updated in tandem with code changes. In this way, techniques described herein facilitate more consistent and accurate documentation generation. Additionally, these annotations that explain the code are not needed for the documentation generation described herein and can be eliminated altogether from a code file. In this way, significant reductions to the sizes of code files can be achieved, thereby reducing the consumption of computing resources involved in storing, retrieving, copying, and/or transmitting code files.

FIGS. 1A-1E are diagrams of an example 100 associated with object-based documentation generation. As shown in FIGS. 1A-1E, example 100 includes a documentation system, a version control system, a deployment system, and a production system. These devices are described in more detail in connection with FIGS. 2 and 3. In some implementations, the documentation system may include, or may be included in, the version control system, the production system, and/or the deployment system. In some implementations, the documentation system, the version control system, the deployment system, and/or the production system may be components of a higher-level system.

The version control system may include one or more code repositories that store source code and/or one or more document repositories that store end-user documentation documents for publication with the publication system. In some implementations, the version control system may include a plurality of code repositories, and each code repository may be associated with a codebase for a respective cloud service resource (e.g., a cloud-based server instance, a cloud-based serverless function, or the like). For example, the code repository may store source code for deployment of the cloud service resource, which may include one or more code files containing definitions (e.g., error code definitions) to be converted to end-user documentation. The deployment system may implement a continuous Integration and continuous delivery (CI/CD) pipeline for deployment of a codebase in the version control system. The production system may implement a documentation portal where a set of documentation (e.g., end-user documentation) can be browsed, viewed, searched, or the like.

As shown in FIG. 1A, and by reference number 105, the documentation system may detect a triggering event for generating a documentation document. In some implementations, the triggering event is an occurrence of a periodic time interval (e.g., the documentation system may generate documentation document(s) at a scheduled time). Accordingly, the documentation system may monitor for the occurrence of the periodic time interval, and may initiate documentation generation responsive to detecting the occurrence of the periodic time interval. In some implementations, the triggering event is a change to a code file in a code repository (e.g., a code file containing definitions that are to be converted to end-user documentation). Accordingly, the documentation system may monitor the code repository for a change (e.g., an update or a new version) to the code file, and may initiate documentation generation responsive to detecting the change to the code file.

In some implementations, the triggering event is a change to a list of codebases or code repositories to include a new codebase or code repository. For example, the list of codebases or code repositories may indicate a codebase name (e.g., a name of a project or an application associated with the codebase), a code repository name, a file path to a code repository, or the like. The documentation system may perform documentation generation for each codebase/code repository in the list of codebases or code repositories. Accordingly, the documentation system may monitor the list for a change (e.g., an addition) to include the new codebase or code repository, and may initiate documentation generation for the new codebase or code repository responsive to detecting the change to the list.

Figure 1B:
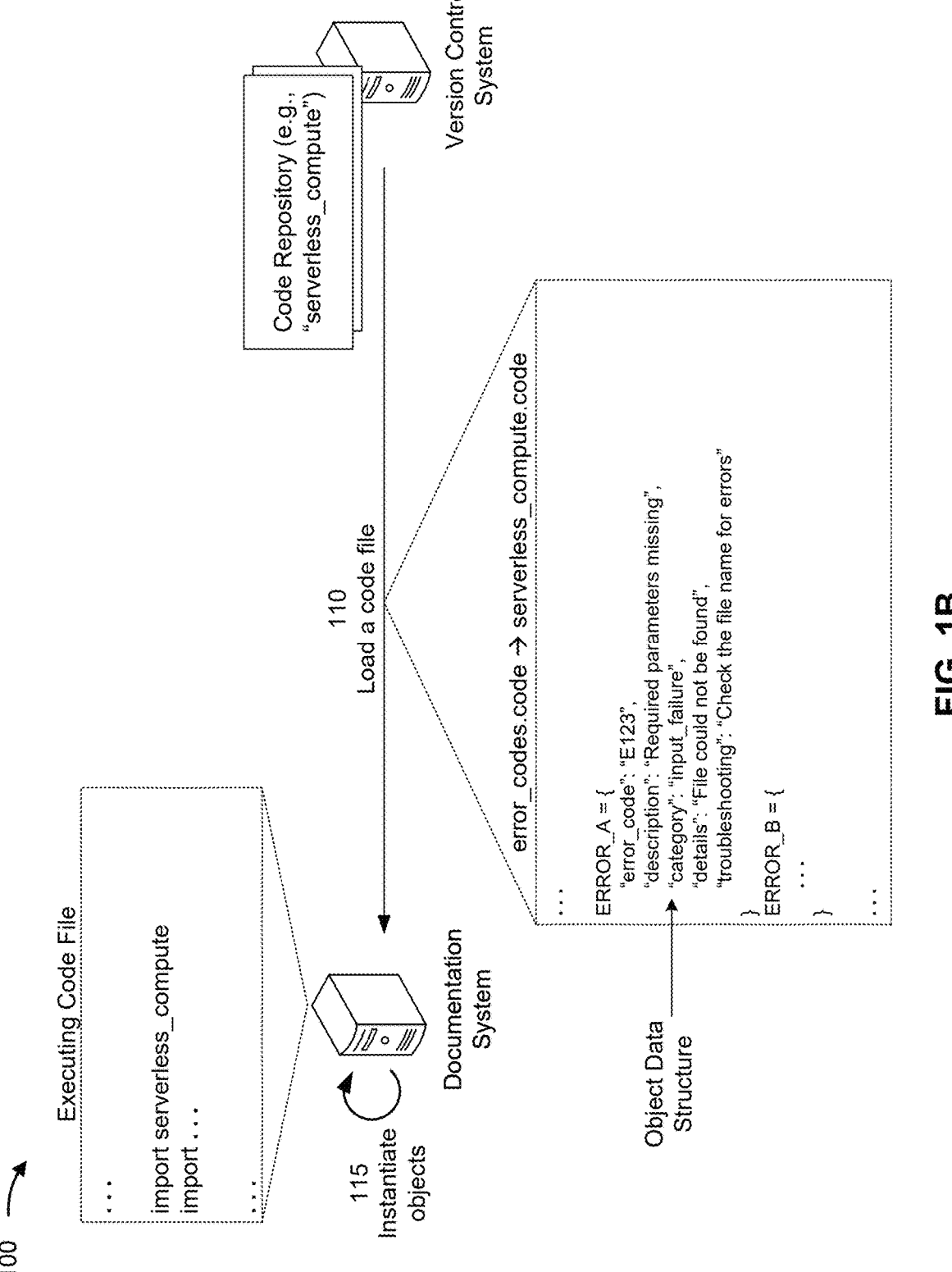

As shown in FIG. 1B, and by reference number 110, the documentation system may load, from a code repository, a code file. For example, the documentation system may load the code file responsive to the triggering event. The code repository may be associated with a cloud service resource (e.g., the code repository may contain a codebase for the cloud service resource).

The code file may contain code for a plurality of object data structures that indicate respective values for a set of object parameters. For example, the code may programmatically represent (e.g., using a programming language) the object data structures. Thus, the code is in a form for interpretation by a code interpreter. In addition to the code in the form for interpretation by the code interpreter, the code file may include one or more comments that are not in the form for interpretation by the code interpreter (e.g., the comments are in a form that is ignored by the code interpreter). As described herein, the code in the form for interpretation is used for documentation generation, and the comments may be ignored for purposes of documentation generation. In this way, code files used for documentation generation may include fewer comments, thereby reducing sizes of the code files.

In one example, the code file may indicate error code definitions (e.g., for the cloud service resource associated with the code repository). For example, the object data structures may relate to error codes associated with deployment of cloud infrastructure (e.g., error codes generated by a cloud computing service, the deployment system, and/or a CI/CD pipeline application). For example, each object data structure may relate to an error code, and may indicate values (e.g., attributes or properties) for the set of object parameters with respect to that error code. The set of object parameters may indicate an identifier for the error code, a description of the error code, a category associated with the error code, details relating to the error code, and/or troubleshooting information relating to the error code, among other examples.

In some implementations, to load the code file, the documentation system may load (e.g., import) the code file as a module (e.g., as a library) into another executing code file. For example, the executing code file may provide orchestration for the documentation system, and loading the code file into the executing code file may allow the executing code file to interact with the code of the code file (e.g., rather than interacting with plain-text comments). In some implementations, in connection with loading the code file, the documentation system may rename the code file based on a name of the code repository. For example, the documentation system may change the name of the code file to, or to include, the name of the code repository. As described herein, this renaming facilitates the generation of metadata for documentation and prevents duplicate or generic metadata that may otherwise result from similarly named code files. In some implementations, in connection with loading the code file, the documentation system may convert a format of the code file (e.g., convert a programming language used for the code file) from a first format to a second format, so that subsequent operations on the code file can be standardized for the second format.

As shown by reference number 115, the documentation system may instantiate a plurality of objects in accordance with the object data structures in the code of the code file. For example, in connection with loading the code file, the documentation system may generate the objects, initialize the objects, and/or allocate memory to store data for the objects. By instantiating the objects, the documentation system can interact with and manipulate the values in the object data structures as code.

Figure 1C:
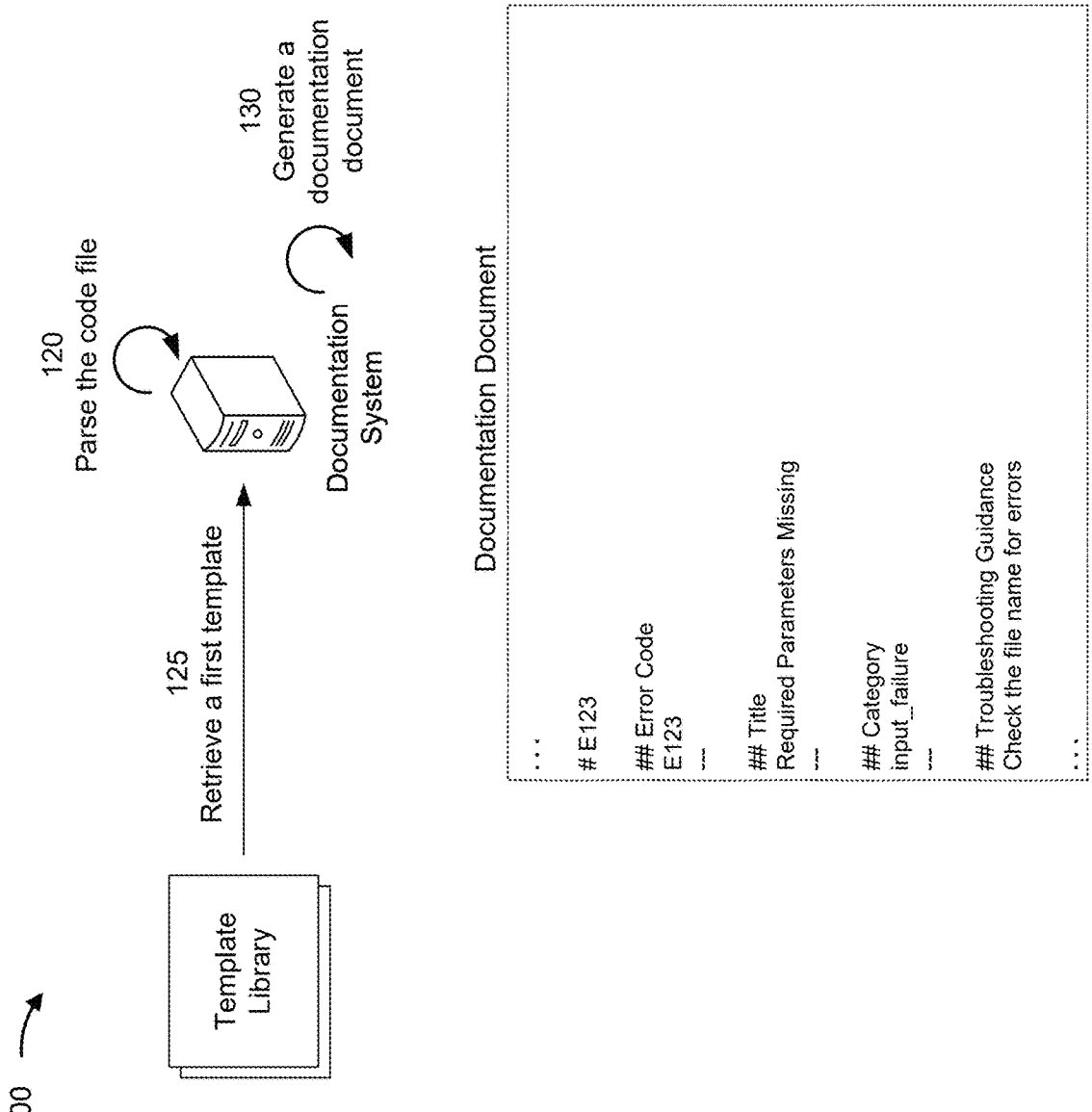

As shown in FIG. 1C, and by reference number 120, the documentation system may parse the code file. For example, the documentation system may parse the code file to interact with the objects. In some implementations, the documentation system may parse the code file to format the objects. Formatting the objects may include standardizing the set of object parameters used for each of the objects (e.g., so that each of the objects holds values according to a standardized set of object parameters) and/or standardizing the values held by each of the objects (e.g., so that the values adhere to a uniform style). For example, the documentation system may format the objects according to a uniform style (e.g., a uniform capitalization style, a uniform punctuation style, or the like). As another example, the documentation system may add values (e.g., default values or generic values) to each of the objects for a parameter (e.g., a required parameter) that is absent from the set of object parameters, and/or delete values from each of the objects for a parameter (e.g., a nonessential parameter) that is in the set of object parameters. In some implementations, the documentation system may parse the code file to extract the values for the set of object parameters from the objects.

As shown by reference number 125, the documentation system may retrieve a first template that provides a first formatting used for generating end-user documentation (e.g., the end-user documentation uses the first formatting or is based on the first formatting). The first template may be template code or a template code file. The documentation system may retrieve the first template from a template library (e.g., a template code file that contains multiple templates, or a file repository that contains multiple template files). The first template may be configured to format the objects using the first formatting. The first formatting may be based on Markdown, hypertext markup language (HTML), or the like. In addition to the first formatting, the first template may also include static introductory text, static section headings, or the like.

In some implementations, the documentation system may select the first template (e.g., from among multiple templates) in accordance with the objects. For example, the documentation system may select the first template in accordance with the content and/or structure of the objects (e.g., in accordance with the respective values associated with each of the objects and/or in accordance with the set of object parameters). As an example, the documentation system may select the first template in accordance with which parameters are included in the set of parameters (e.g., one template may be configured to accommodate a first set of parameters, another template may be configured to accommodate a second set of parameters, and so forth).

As shown by reference number 130, the documentation system may generate a documentation document (e.g., a Markdown document, an HTML document, or the like) using the objects and the first template. For example, the documentation system may generate the documentation document using the respective values, held by each object, for the set of object parameters. As an example, the documentation system may iterate through each object, insert the values held by that object into the first template to generate a formatted output, and combine the formatted outputs for all of the objects into the documentation document. In some implementations, the documentation system may sort the objects (e.g., in accordance with values held by the objects, such as alphanumerically in accordance with a first object parameter, categorically in accordance with a second object parameter, or the like) prior to iterating through the objects. The iteration and/or the sorting is facilitated and simplified through the use of the objects (e.g., compared to manipulation of plain-text annotations).

Figure 1D:
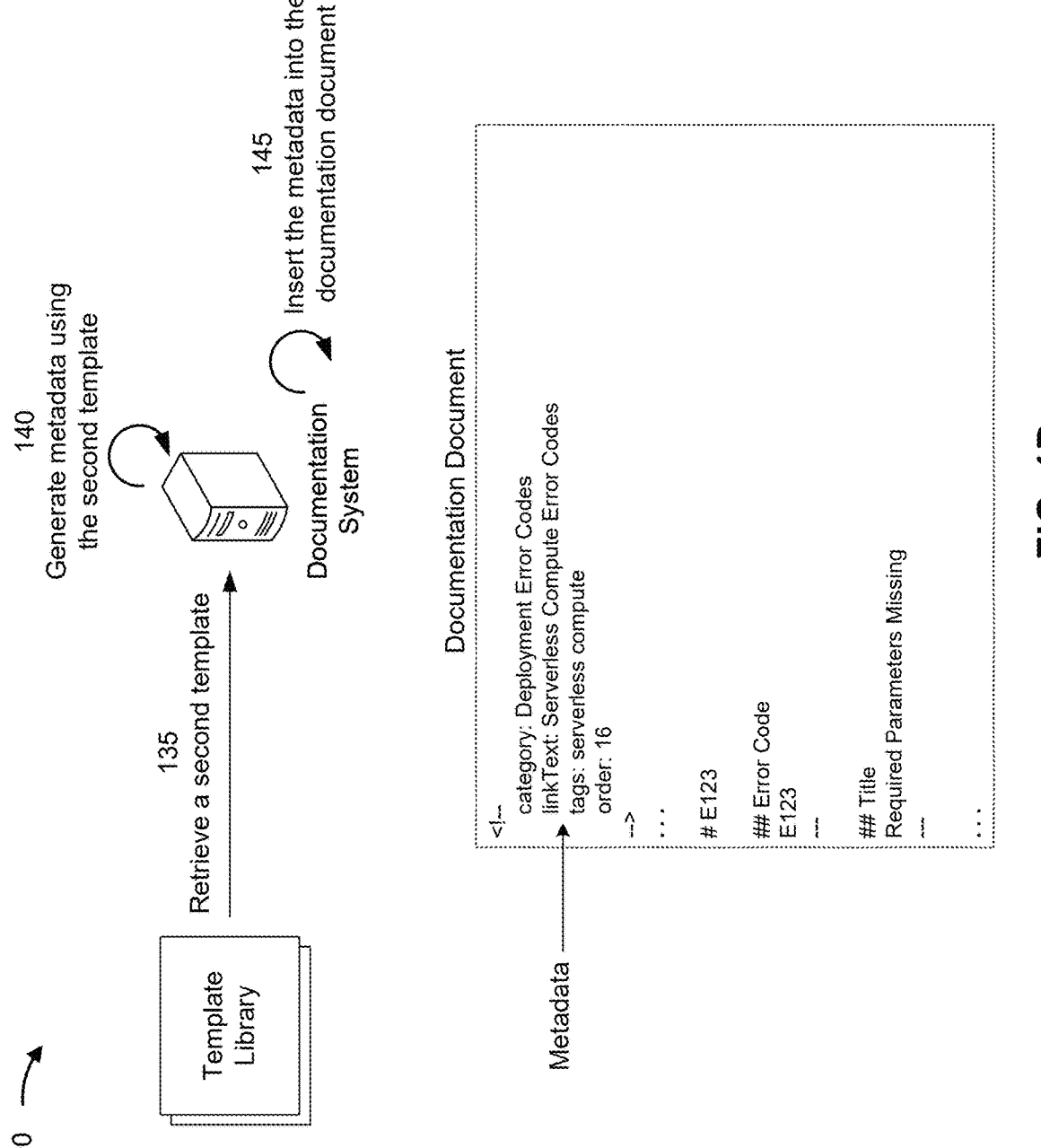

As shown in FIG. 1D, and by reference number 135, the documentation system may retrieve a second template that provides a second formatting (e.g., a different formatting than the first formatting) used for generating metadata for the end-user documentation. The second template may be template code or a template code file. The documentation system may retrieve the second template from a template library (e.g., a template code file that contains multiple templates, or a file repository that contains multiple template files), which may be the same as or different from the template library from which the first template is retrieved. The second template may be configured to format the metadata using the second formatting. The second formatting may be based on a comment format (e.g., used for interpreter-ignored text), such as a Markdown comment format, an HTML comment format, or the like.

As shown by reference number 140, the documentation system may generate the metadata using the second template. The metadata may indicate information that can be used by the production system to organize the documentation document in the documentation portal. For example, the metadata may indicate one or more categories (e.g., a category hierarchy) for the documentation document, link text used for a hyperlink to the documentation document, tags for the documentation document, and/or a sort order for the documentation document (e.g., an order in which a hyperlink to the documentation document is to appear in a navigation menu), among other examples.

In some implementations, the documentation system may generate the metadata based on the name of the code file (e.g., the name of the code file resulting from the documentation system renaming the code file in accordance with the name of the code repository). For example, one or more categories, the link text, and/or one or more tags, among other examples, for the documentation document may be based on the name of the code file. Thus, the renaming of the code file, as described herein, produces unique metadata for each documentation document that is generated, thereby facilitating organization of a set of documentation using a small amount of metadata and without extensive communication between the documentation system and the production system.

Figure 1E:
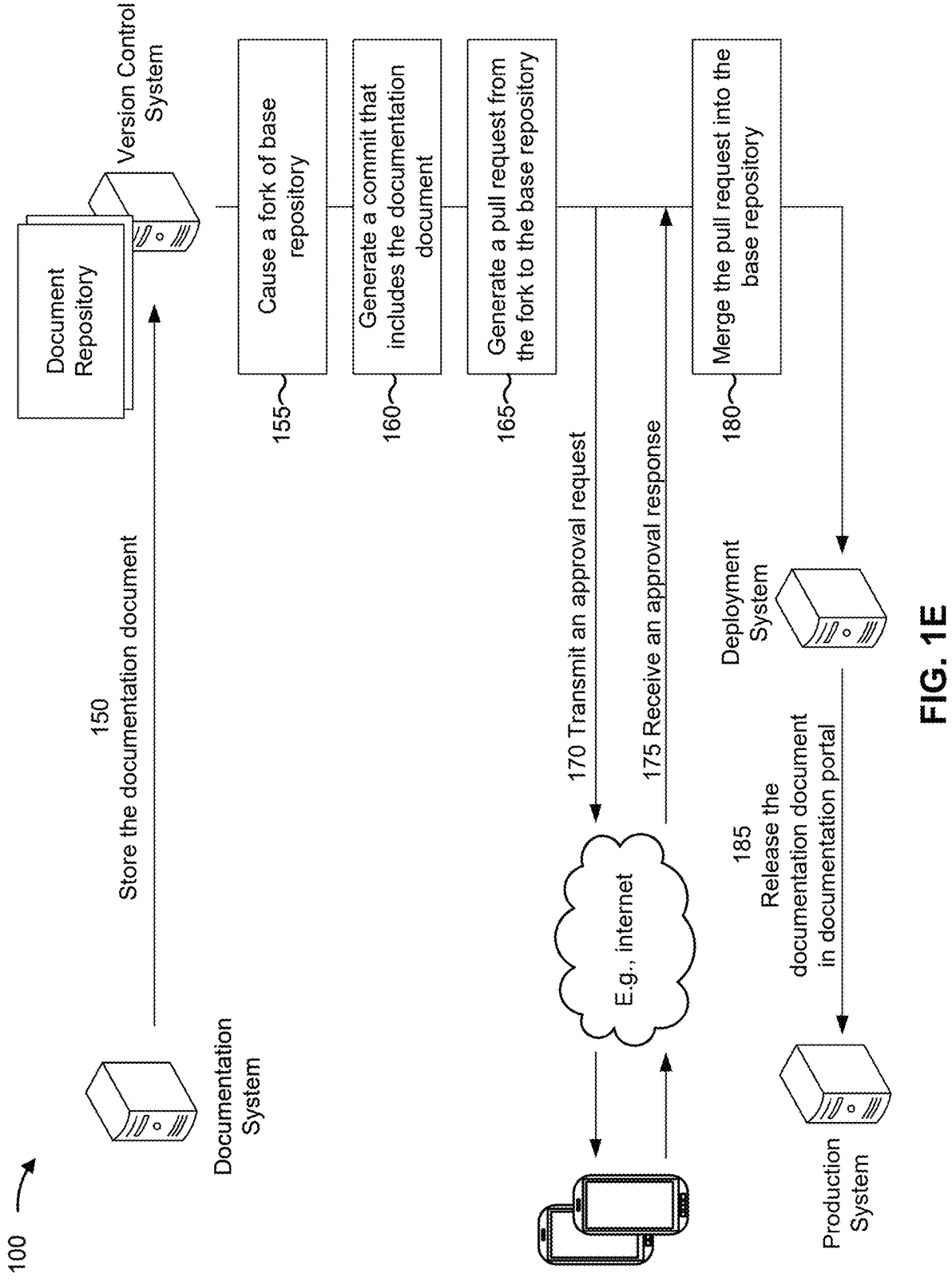

As shown by reference number 145, the documentation system may insert the metadata into the documentation document. For example, the documentation system may prepend or append the metadata to the documentation document. Accordingly, following insertion of the metadata into the documentation document, the documentation document may contain the metadata (e.g., in a comment form, so that it is not interpreted by a Markdown interpreter, an HTML interpreter, or the like) and the main documentation data (e.g., in a Markdown form, in an HTML form, or the like). As shown in FIG. 1E, and by reference number 150, the documentation system may store the documentation document in a document repository or another storage system. For example, the document repository may be implemented by the version control system. The documentation system may continue this process for documentation generation for each codebase or code repository designated for documentation generation (e.g., by the list of codebases or code repositories).

As shown by reference number 155, the version control system may cause a fork of a base repository. The base repository may contain a set of documentation for the production system. In some implementations, the base repository may be forked in response to the triggering event for generating the documentation document, in response to generation of the documentation document, or in response to the documentation document being stored. Accordingly, the documentation system may cause the version control system to fork the base repository by detecting the triggering event, by generating the documentation document, and/or by storing the documentation document. The fork of the base repository may occur automatically without manual intervention. For example, the deployment system may orchestrate the fork in connection with the CI/CD pipeline implemented by the deployment system. In some implementations, the fork of the base repository may be the document repository in which the documentation system stored the documentation document (e.g., the fork may occur before the documentation system generates the documentation document). In some implementations, the documentation document stored in the document repository may be copied to the fork (e.g., the fork may occur after the documentation system generates the documentation document).

As shown by reference number 160, the version control system may generate a commit, to the fork, that includes the documentation document. For example, the documentation system may cause the generation of the commit by generating and/or storing the documentation document. The commit may be generated automatically without manual intervention. For example, the deployment system may orchestrate the commit in connection with the CI/CD pipeline implemented by the deployment system.

As shown by reference number 165, the version control system may generate a pull request, that includes the commit, from the fork to the base repository. For example, the documentation system may cause the generation of the pull request by generating and/or storing the documentation document. The pull request may be generated automatically without manual intervention. For example, the deployment system may orchestrate the pull request in connection with the CI/CD pipeline implemented by the deployment system.

As shown by reference number 170, the version control system and/or the documentation system may transmit an approval request for the pull request. For example, the version control system and/or the documentation system may transmit the approval request via one or more email messages, one or more instant messenger messages, or the like (e.g., intended for one or more designated reviewers). The approval request may indicate a request for review, approval, merge, and release of the documentation document. In some implementations, the documentation system may cause the version control system to transmit the approval request by generating and/or storing the documentation document. As shown by reference number 175, the version control system and/or the documentation system may receive an approval response indicating an approval of the pull request.

As shown by reference number 180, the version control system may merge the pull request into the base repository. For example, the version control system may merge the pull request responsive to the approval of the pull request. In some implementations, the documentation system may cause the merging of the pull request by detecting the triggering event, by generating the documentation document, and/or by storing the documentation document. The pull request may be merged automatically without manual intervention. For example, the deployment system may orchestrate merging the pull request in connection with the CI/CD pipeline implemented by the deployment system.

As shown by reference number 185, after the pull request is merged into the base repository, the documentation document may be released in the documentation portal of the production system (e.g., via the deployment system). In some implementations, the production system may generate a production document, that is used in the documentation portal, using the documentation document. For example, the documentation document may be a Markdown document, and the production document may be an HTML document generated by the production system using the Markdown document. In some implementations, the production system may organize the documentation document or the production document in the documentation portal using the metadata of the documentation document. For example, the production system may place the documentation document or the production document in a categorical hierarchy using one or more categories indicated by the metadata, my generate hyperlinks to the documentation document or the production document using link text indicated by the metadata, and/or may generate a navigation menu for the document portal using a sort order indicated by the metadata, among other examples.

Through the use of objects, as described herein, standardized and up-to-date documentation can be generated responsive to any changes to code even if accompanying annotations are not updated in tandem with code changes. In this way, techniques described herein facilitate more consistent and accurate documentation generation. Additionally, these annotations that explain the code are not needed for the documentation generation described herein and can be eliminated altogether from the code file. In this way, significant reductions in the sizes of code files can be achieved, thereby reducing the consumption of computing resources involved in storing, retrieving, copying, and/or transmitting code files.

As indicated above, FIGS. 1A-1E are provided as an example. Other examples may differ from what is described with regard to FIGS. 1A-1E.

Figure 2:
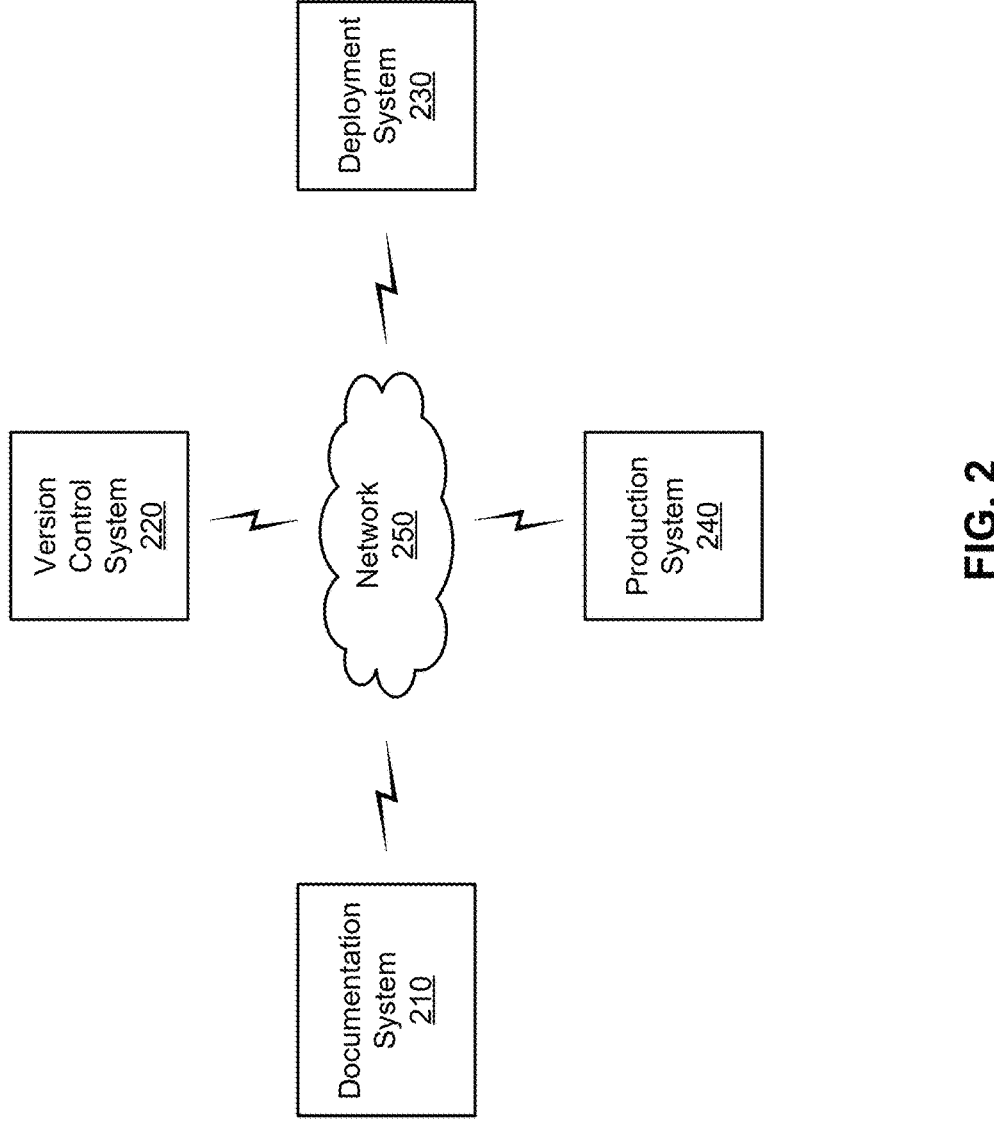
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a documentation system 210, a version control system 220, a deployment system 230, a production system 240, and a network 250. Devices of environment 200 may interconnect via wired connections, wireless connections, or a combination of wired and wireless connections.

The documentation system 210 may include one or more devices capable of receiving, generating, storing, processing, providing, and/or routing information associated with object-based documentation generation, as described elsewhere herein. The documentation system 210 may include a communication device and/or a computing device. For example, the documentation system 210 may include a server, such as an application server, a client server, a web server, a database server, a host server, a proxy server, a virtual server (e.g., executing on computing hardware), or a server in a cloud computing system. In some implementations, the documentation system 210 may include computing hardware used in a cloud computing environment.

The version control system 220 may include one or more devices capable of receiving, generating, storing, processing, providing, and/or routing information associated with object-based documentation generation, as described elsewhere herein. For example, the version control system 220 may implement one or more repositories and may facilitate version control operations in connection with the repositories. The version control system 220 may include a communication device and/or a computing device. For example, the version control system 220 may include a server, such as an application server, a client server, a web server, a database server, a host server, a proxy server, a virtual server (e.g., executing on computing hardware), or a server in a cloud computing system. In some implementations, the version control system 220 may include computing hardware used in a cloud computing environment.

The deployment system 230 may include one or more devices capable of receiving, generating, storing, processing, providing, and/or routing information associated with object-based documentation generation, as described elsewhere herein. For example, the deployment system 230 may facilitate deployment of documentation to a production environment. The deployment system 230 may include a communication device and/or a computing device. For example, the deployment system 230 may include a server, such as an application server, a client server, a web server, a database server, a host server, a proxy server, a virtual server (e.g., executing on computing hardware), or a server in a cloud computing system. In some implementations, the deployment system 230 may include computing hardware used in a cloud computing environment.

The production system 240 may include one or more devices capable of receiving, generating, storing, processing, providing, and/or routing information associated with object-based documentation generation, as described elsewhere herein. For example, the production system 240 may implement a documentation portal in a production environment. The production system 240 may include a communication device and/or a computing device. For example, the production system 240 may include a server, such as an application server, a client server, a web server, a database server, a host server, a proxy server, a virtual server (e.g., executing on computing hardware), or a server in a cloud computing system. In some implementations, the production system 240 may include computing hardware used in a cloud computing environment.

The network 250 may include one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
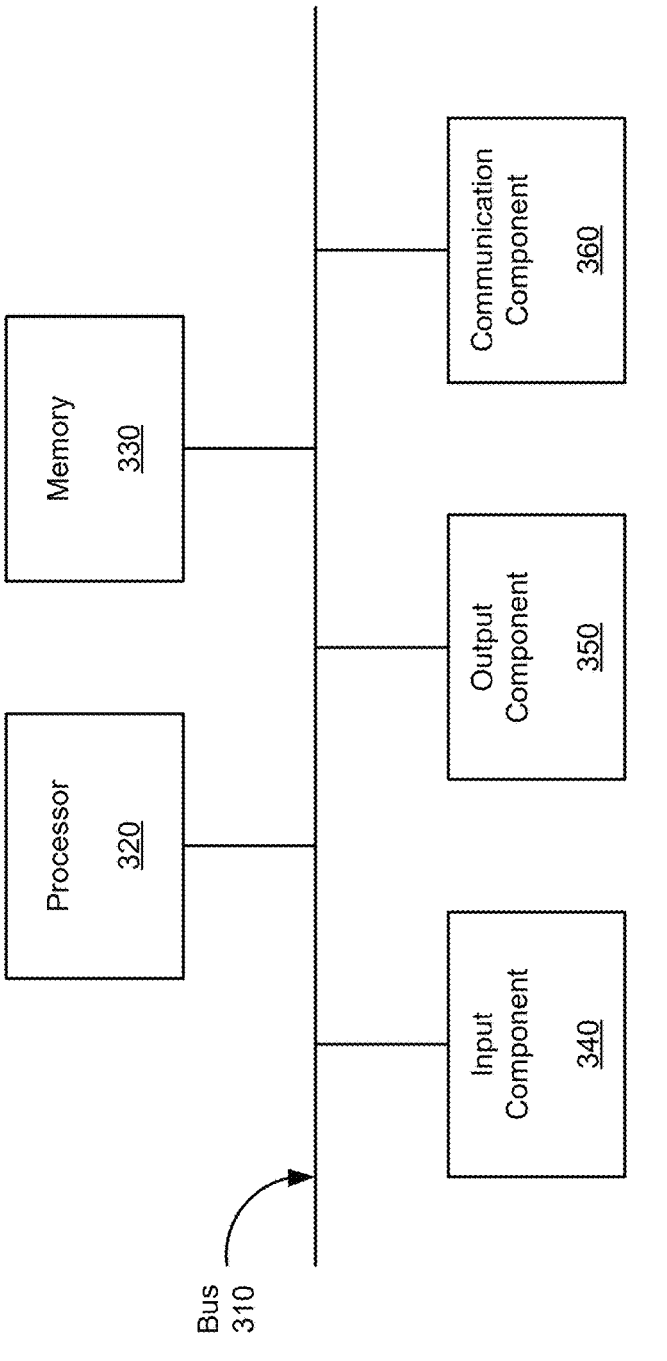
FIG. 3 is a diagram of example components of a device associated with object-based documentation generation, in accordance with some embodiments of the present disclosure.

FIG. 3 is a diagram of example components of a device 300 associated with object-based documentation generation. The device 300 may correspond to documentation system 210, version control system 220, deployment system 230, and/or production system 240. In some implementations, documentation system 210, version control system 220, deployment system 230, and/or production system 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with object-based documentation generation. In some implementations, one or more process blocks of FIG. 4 may be performed by the documentation system 210. In some implementations, one or more process blocks of FIG. 4 may be performed by another device or a group of devices separate from or including the documentation system 210, such as the version control system 220, the deployment system 230, and/or the production system 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include loading, from a code repository, a code file containing code for a plurality of object data structures that indicate respective values for a set of object parameters (block 410). For example, the documentation system 210 (e.g., using processor 320, memory 330, and/or communication component 360) may load, from a code repository, a code file containing code for a plurality of object data structures that indicate respective values for a set of object parameters, as described above in connection with reference number 110 of FIG. 1B. As an example, the object data structures may relate to error codes associated with deployment of cloud infrastructure. In some implementations, the code is in a form for interpretation by a code interpreter.

As further shown in FIG. 4, process 400 may include instantiating a plurality of objects in accordance with the plurality of object data structures (block 420). For example, the documentation system 210 (e.g., using processor 320 and/or memory 330) may instantiate a plurality of objects in accordance with the plurality of object data structures, as described above in connection with reference number 115 of FIG. 1B. As an example, in connection with loading the code file, the documentation system 210 may generate the objects, initialize the objects, and/or allocate memory to store data for the objects.

As further shown in FIG. 4, process 400 may include retrieving a first template that provides a first formatting used for generating end-user documentation (block 430). For example, the documentation system 210 (e.g., using processor 320, memory 330, and/or communication component 360) may retrieve a first template that provides a first formatting used for generating end-user documentation, as described above in connection with reference number 125 of FIG. 1C. As an example, the first formatting may be based on Markdown, HTML, or the like.

As further shown in FIG. 4, process 400 may include generating a documentation document using the plurality of objects and the first template (block 440). For example, the documentation system 210 (e.g., using processor 320 and/or memory 330) may generate a documentation document using the plurality of objects and the first template, as described above in connection with reference number 130 of FIG. 1C. As an example, the documentation system 210 may iterate through each object, insert the values held by that object into the first template to generate a formatted output, and combine the formatted outputs for all of the objects into the documentation document.

As further shown in FIG. 4, process 400 may include retrieving a second template that provides a second formatting used for generating metadata for the documentation document (block 450). For example, the documentation system 210 (e.g., using processor 320, memory 330, and/or communication component 360) may retrieve a second template that provides a second formatting used for generating metadata for the documentation document, as described above in connection with reference number 135 of FIG. 1D. As an example, the second formatting may be based on a comment format (e.g., used for interpreter-ignored text), such as a Markdown comment format, an HTML comment format, or the like.

As further shown in FIG. 4, process 400 may include generating the metadata using the second template (block 460). For example, the documentation system 210 (e.g., using processor 320 and/or memory 330) may generate the metadata using the second template, as described above in connection with reference number 140 of FIG. 1D. As an example, the metadata may indicate information that can be used to organize the documentation document in a documentation portal.

As further shown in FIG. 4, process 400 may include inserting the metadata into the documentation document (block 470). For example, the documentation system 210 (e.g., using processor 320 and/or memory 330) may insert the metadata into the documentation document, as described above in connection with reference number 145 of FIG. 1D. As an example, the metadata may be prepended or appended to the documentation document.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1E. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for object-based documentation generation, the system comprising:
 one or more memories; and
 one or more processors, communicatively coupled to the one or more memories, configured to:
  load, from a code repository, a code file containing code for a plurality of object data structures that indicate respective values for a set of object parameters, wherein the code is in a form for interpretation by a code interpreter;
  instantiate a plurality of objects in accordance with the plurality of object data structures;
  parse the code file to extract the respective values for the set of object parameters from the plurality of objects;
  retrieve a first template that provides a first formatting used for generating end-user documentation;

generate a documentation document using the respective values for the set of object parameters and the first template;

retrieve a second template that provides a second formatting used for generating metadata for the documentation document;

generate the metadata using the second template;

insert the metadata into the documentation document; and store the documentation document in a document repository.

2. The system of claim 1, wherein the one or more processors are further configured to:

cause a fork of a base repository;

cause generation of a commit, to the fork, including the documentation document;

cause generation of a pull request, that includes the commit, from the fork to the base repository; and cause merging, responsive to an approval of the pull request, of the pull request into the base repository.

3. The system of claim 2, wherein the one or more processors are further configured to:

transmit, via an email message or an instant messenger message, an approval request for the pull request; and receive an approval response indicating the approval of the pull request.

4. The system of claim 1, wherein the one or more processors, to load the code file, are configured to:

load the code file as a module into another executing code file.

5. The system of claim 1, wherein the code file includes the code in the form for interpretation by the code interpreter, and includes one or more comments that are not in the form for interpretation by the code interpreter.

6. The system of claim 1, wherein the one or more processors, to parse the code file, are further configured to:

format the plurality of objects.

7. The system of claim 1, wherein the one or more processors, to parse the code file, are further configured to:

add values to the respective values for a first parameter that is absent from the set of object parameters, or delete values from the respective values for a second parameter in the set of object parameters.

8. The system of claim 1, wherein the plurality of object data structures relate to error codes associated with deployment of cloud infrastructure.

9. A method of object-based documentation generation, comprising:

loading, from a code repository, a code file containing code for a plurality of object data structures that indicate respective values for a set of object parameters, wherein the code is in a form for interpretation by a code interpreter;

instantiating a plurality of objects in accordance with the plurality of object data structures;

retrieving a first template that provides a first formatting used for generating end-user documentation;

generating a documentation document using the plurality of objects and the first template;

retrieving a second template that provides a second formatting used for generating metadata for the documentation document;

generating the metadata using the second template; and inserting the metadata into the documentation document.

10. The method of claim 9, wherein loading the code file comprises:

renaming the code file based on a name of the code repository.

11. The method of claim 9, wherein generating the metadata comprises:

generating the metadata based on a name of the code file.

12. The method of claim 9, further comprising:

parsing the code file to:

format the plurality of objects, and extract the respective values for the set of object parameters from the plurality of objects.

13. The method of claim 9, wherein loading the code file comprises:

loading the code file as a module into another executing code file.

14. The method of claim 9, wherein the code file includes the code in the form for interpretation by the code interpreter, and includes one or more comments that are not in the form for interpretation by the code interpreter.

15. A non-transitory computer-readable medium storing a set of instructions, the set of instructions comprising:

one or more instructions that, when executed by one or more processors of a device, cause the device to:

load, from a code repository, a code file containing code for a plurality of object data structures that indicate respective values for a set of object parameters, wherein the code is in a form for interpretation by a code interpreter;

instantiate a plurality of objects in accordance with the plurality of object data structures;

parse the code file to format the plurality of objects;

retrieve a template that provides a formatting used for generating end-user documentation; and generate a documentation document using the plurality of objects and the template.

16. The non-transitory computer-readable medium of claim 15, wherein the one or more instructions, when executed by the one or more processors, further cause the device to:

detect a triggering event for generating the documentation document, and wherein the one or more instructions, that cause the device to load the code file, cause the device to:

load the code file responsive to the triggering event.

17. The non-transitory computer-readable medium of claim 16, wherein the triggering event is an occurrence of a periodic time interval, a change to the code file, or a change to a list of codebases or code repositories to include a new codebase or code repository associated with the code file.

18. The non-transitory computer-readable medium of claim 15, wherein the one or more instructions, when executed by the one or more processors, further cause the device to:

retrieve an additional template that provides a different formatting used for generating metadata for the documentation document;

generate the metadata using the additional template; and insert the metadata into the documentation document.

19. The non-transitory computer-readable medium of claim 15, wherein the one or more instructions, that cause the device to load the code file, cause the device to:

load the code file as a module into another executing code file.

20. The non-transitory computer-readable medium of claim 15, wherein the code file includes the code in the form for interpretation by the code interpreter, and includes one or more comments that are not in the form for interpretation by the code interpreter.

\* \* \* \* \*